United States Patent
Aitken et al.

(10) Patent No.: US 9,994,478 B2
(45) Date of Patent: *Jun. 12, 2018

(54) ALKALI SELENOGERMANATE GLASSES

(71) Applicant: Corning Incorporated, Corning, NY (US)

(72) Inventors: Bruce Gardiner Aitken, Corning, NY (US); Stephen Charles Currie, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/184,476

(22) Filed: Jun. 16, 2016

(65) Prior Publication Data

US 2016/0289115 A1 Oct. 6, 2016

Related U.S. Application Data

(62) Division of application No. 14/443,846, filed as application No. PCT/US2013/071428 on Nov. 22, 2013, now Pat. No. 9,475,725.

(60) Provisional application No. 61/730,678, filed on Nov. 28, 2012.

(51) Int. Cl.
  *C03C 3/32* (2006.01)
  *C03C 4/10* (2006.01)
  *C03C 4/18* (2006.01)

(52) U.S. Cl.
  CPC .............. *C03C 3/321* (2013.01); *C03C 4/10* (2013.01); *C03C 4/18* (2013.01); *C03C 2204/00* (2013.01)

(58) Field of Classification Search
  CPC .................................... C03C 3/32; C03C 3/321
  See application file for complete search history.

(56) References Cited

U.S. PATENT DOCUMENTS

| | | | |
|---|---|---|---|
| 4,542,108 A | 9/1985 | Susman et al. | |
| 5,389,584 A | 2/1995 | Aitken et al. | |
| 5,392,376 A | 2/1995 | Aitken et al. | |
| 5,846,889 A | 12/1998 | Harbison et al. | |
| 6,277,775 B1 | 8/2001 | Aitken | |
| 8,541,324 B2 | 9/2013 | Aitken et al. | |
| 9,475,725 B2 * | 10/2016 | Aitken | C03C 3/321 |
| 2006/0223688 A1 | 10/2006 | Zhang et al. | |
| 2012/0135850 A1 | 5/2012 | Aitken et al. | |
| 2013/0278999 A1 | 10/2013 | Carlie | |

FOREIGN PATENT DOCUMENTS

EP    1034145 A1    6/1999

OTHER PUBLICATIONS

Jean-Luc Adams; "Lanthanides in Non-Oxides Glasses"; Chem, Rev, 2002, 102, 2461-2476.
Calvez et al; "Influence of Gallium and Alkali Halide Addition on the Optical and Thermo-Mechanical Properties of GeSe2—Ga2Se3 Glass"; Appl. Phys. a 89, 183-188 (2007).
Roze et al; "Optical and Mechanical Properties of Glasses and Glass-Ceramics Based on the Ge—Ga—Se System"; J. Am. Ceram. Soc. 91 [11] 3566-3570 (2008).
Zhiyong Yang et al: "Visible Transparent 1-15 GeSe 2 ?Ga 2 Se 3 ?KX (X=I, Br, or Cl) Glasses for Infrared Optics", Journal of the American Ceramic Society., vol. 90, No. 2, Feb. 1, 2007 (Feb. 1, 2007), pp. 667-669, XP055271259, us ISSN: 0002-7820.

\* cited by examiner

*Primary Examiner* — Elizabeth A. Bolden
(74) *Attorney, Agent, or Firm* — Dinsmore & Shohl LLP

(57) ABSTRACT

Selenogermanate, selenogallo- or selenoindo-germanate glasses that are modified by alkali metals, for example, Na or Li and, as such, are characterized by high alkali ion mobility or conductivity. Ionic conducting chalcogenide glasses have potential application as an electrolyte medium for solid state batteries.

15 Claims, No Drawings

ALKALI SELENOGERMANATE GLASSES

CROSS-REFERENCE TO RELATED APPLICATIONS

This application is a divisional of U.S. patent application Ser. No. 14/443,846 filed on Nov. 22, 2013, which claims the benefit of priority under 35 U.S.C. Section 371 of International Patent Application No. PCT/US13/71428 filed on Nov. 22, 2013, which claims benefit to U.S. Patent Application Ser. No. 61/730,678 filed on Nov. 28, 2012, the content of which is relied upon and incorporated herein by reference in its entirety, and the benefit of priority under 35 U.S.C. § 120 is hereby claimed.

FIELD

This disclosure relates generally to chalcogenide glass compositions and more particularly to infrared (IR) transmitting or ionic conducting chalcogenide glasses useful for, for example, an electrolyte medium, windows, waveguiding fibers, or host glasses for luminescent dopants.

BACKGROUND

U.S. Pat. No. 5,846,889 "Infrared Transparent Selenide Glasses" discloses alkaline earth Ga and/or In-containing selenogermanate glasses comprising at least 5% RSe (where R=alkaline earth), 0.5-25% $Ga_2Se_3$ and/or $In_2Se_3$, 20-70% $GeSe_2$ with the provision for rare earth dopants. However, due to the relatively Ga- or In-poor nature of the compositions, it is likely that rare-earth dopants in such glasses are clustered and, therefore, characterized by reduced luminescent efficiency.

It would be advantageous to expand the range of the glassforming region of modified selenogermanate glasses which may allow for greater flexibility in tailoring glass properties such as characteristic temperatures (e.g. $T_g$), thermal expansion coefficient, refractive index, conductivity, etc. that may be important for specific applications.

SUMMARY

Significant expansion of the glassforming region of modified selenogermanate glasses allows for greater flexibility in tailoring glass properties such as characteristic temperatures (e.g. $T_g$), thermal expansion coefficient, refractive index, conductivity, etc. that may be important for specific applications. Moreover, the fact that the alkali to Ga and/or In ratio can be significantly greater than one is expected to result in increased mobility of the alkali modifier and, hence, improved conductivity of such glasses. Moreover, with alkali instead of alkaline earth as a modifier, stable selenogermanate glasses can be made with $GeSe_2$ contents as low as 50%, resulting in a significantly higher modifier content and, hence, further increase in conductivity.

This disclosure relates to selenogermanate, selenogallo- or selenoindo-germanate glasses that are modified by alkali metals, for example, Na or Li and, as such, are characterized by high alkali ion mobility or conductivity. Ionic conducting chalcogenide glasses have potential application as an electrolyte medium for solid state batteries. This disclosure also relates to Ga- or In-containing chalcogenide glasses based on $GeSe_2$ that are modified by the presence of one or more alkali metals, particularly Na and Li. This disclosure also relates too infrared transmitting glasses that could be used in applications ranging from infrared windows and waveguiding fibers to luminescent materials when doped with an appropriate rare earth or transition metal.

One embodiment is a glass composition comprising in mole percent:
  45 to 99 percent $GeX_2$;
  0 to 50 percent $Ga_2X_3$, $In_2X_3$, or a combination thereof; and
  0.5 to 50 percent $M_2X$, wherein M is an alkali metal, wherein X is Se, S, Te or a combination thereof, wherein at least 50 mole percent of the total X is Se, and wherein the X content is in the range of from 70 to 130% of the stoichiometric amount.

One embodiment is a glass composition comprising in mole percent:
  45 to 99 percent $GeSe_2$;
  0 to 50 percent $Ga_2Se_3$, $In_2Se_3$, or a combination thereof; and
  0.5 to 50 percent $M_2Se$, wherein M is an alkali metal, and wherein the Se content is in the range of from 70 to 130% of the stoichiometric amount.

One embodiment is a glass composition comprising in mole percent:
  45 to 99 percent $GeX_2$;
  0 to 50 percent $Ga_2X_3$, $In_2X_3$, or a combination thereof; and
  0.5 to 50 percent $M_2X+RX$, wherein M is an alkali metal, wherein X is Se, S, Te or a combination thereof, wherein at least 50 mole percent of the total X is Se, wherein R is an alkaline earth metal, and wherein the X content is in the range of from 70 to 130% of the stoichiometric amount.

One embodiment is a glass composition comprising in mole percent:
  45 to 99 percent $GeSe_2$;
  0.5 to 50 percent $Ga_2Se_3$, $In_2Se_3$, or a combination thereof; and
  0.5 to 50 percent $M_2Se$, wherein M is an alkali metal, and wherein the Se content is in the range of from 70 to 130% of the stoichiometric amount.

Additional features and advantages of the invention will be set forth in the detailed description which follows, and in part will be readily apparent to those skilled in the art from the description or recognized by practicing the invention as described in the written description and claims hereof.

It is to be understood that both the foregoing general description and the following detailed description are merely exemplary of the invention, and are intended to provide an overview or framework for understanding the nature and character of the invention as it is claimed.

DETAILED DESCRIPTION

Reference will now be made in detail to various embodiments of the invention.

One embodiment is a glass composition comprising in mole percent:
  45 to 99 percent $GeX_2$;
  0 to 50 percent $Ga_2X_3$, $In_2X_3$, or a combination thereof; and
  0.5 to 50 percent $M_2X$, wherein M is an alkali metal, wherein X is Se, S, Te or a combination thereof, wherein at least 50 mole percent of the total X is Se, and wherein the X content is in the range of from 70 to 130% of the stoichiometric amount.

One embodiment is a glass composition comprising in mole percent:
45 to 99 percent $GeSe_2$;
0 to 50 percent $Ga_2Se_3$, $In_2Se_3$, or a combination thereof; and
0.5 to 50 percent $M_2Se$, wherein M is an alkali metal, and wherein the Se content is in the range of from 70 to 130% of the stoichiometric amount.

One embodiment is a glass composition comprising in mole percent:
45 to 99 percent $GeX_2$;
0 to 50 percent $Ga_2X_3$, $In_2X_3$, or a combination thereof; and
0.5 to 50 percent $M_2X+RX$, wherein M is an alkali metal, wherein X is Se, S, Te or a combination thereof, wherein at least 50 mole percent of the total X is Se, wherein R is an alkaline earth metal, and wherein the X content is in the range of from 70 to 130% of the stoichiometric amount.

One embodiment is a glass composition comprising in mole percent:
45 to 99 percent $GeSe_2$;
0.5 to 50 percent $Ga_2Se_3$, $In_2Se_3$, or a combination thereof; and
0.5 to 50 percent $M_2Se$, wherein M is an alkali metal, and wherein the Se content is in the range of from 70 to 130% of the stoichiometric amount.

In one embodiment, the (Ga and/or In)/R ratio is greater than 1. Having this ratio greater than 1 may provide rare-earth "declustering". In another embodiment, the alkali to Ga and/or In ratio is greater than 1. Having this ratio greater than 1 may provide increased mobility of the alkali modifier and, hence, improved conductivity of such glasses.

The glass composition according to some embodiments, comprises 45 to 99 mole percent $GeSe_2$, for example, 45 or greater percent $GeSe_2$, for example, 50 or greater percent $GeSe_2$, for example, 55 or greater percent $GeSe_2$, for example, 60 or greater percent $GeSe_2$, for example, 65 or greater percent $GeSe_2$, for example, 70 or greater percent $GeSe_2$, for example, 71 or greater percent $GeSe_2$, for example, 72 or greater percent $GeSe_2$, for example, 73 or greater percent GeSe2, for example, 74 or greater percent $GeSe_2$, for example, 75 or greater percent $GeSe_2$, for example, 76 or greater percent $GeSe_2$. The amount of $GeSe_2$ can be any numerical value in the range of from 45 to 99 mole percent, for example from 50 to 75 mole percent.

In one embodiment, the glass composition comprises more than one alkali metal. In some embodiments, the alkali metal is Na, K, Li, Cs, or combinations thereof. In some embodiments, the alkali metal is Na, Li, or a combination thereof.

The glass composition can comprise 0.5 to 50 mole percent $Ga_2Se_3$, $In_2Se_3$, or a combination thereof, for example, 0.5 or greater percent $Ga_2Se_3$, $In_2Se_3$, or a combination thereof, for example, 1 or greater percent, for example, 2 or greater percent, for example, 3 or greater percent, for example, 4 or greater percent, for example, 5 or greater percent, for example, 6 or greater percent, for example, 7 or greater percent, for example, 8 or greater percent, for example, 9 or greater percent, for example, 10 or greater percent, for example, 11 or greater percent, for example, 12 or greater percent, for example, 13 or greater percent, for example, 14 or greater percent, for example, 15 or greater percent, for example, 16 or greater percent, for example, 17 or greater percent, for example, 18 or greater percent, for example, 19 or greater percent, for example, 20 or greater percent, for example, 21 or greater percent, for example, 22 or greater percent, for example, 23 or greater percent, for example, 24 or greater percent, for example, 25 or greater percent, for example, 26 or greater percent, for example, 27 or greater percent, for example, 28 or greater percent, for example, 29 or greater percent, for example, 30 or greater percent, for example, 31 or greater percent, for example, 32 or greater percent, for example, 33 or greater percent, for example, 34 or greater percent, for example, 35 or greater percent, for example, 36 or greater percent, for example, 37 or greater percent, for example, 38 or greater percent, for example, 39 or greater percent, for example, 40 or greater percent, for example, 41 or greater percent, for example, 42 or greater percent, for example, 43 or greater percent, for example, 44 or greater percent, for example, 45 or greater percent. The amount of $Ga_2Se_3$, $In_2Se_3$, or a combination thereof can be any numerical value in the range of from 0.5 to 50 mole percent, for example, 1 to 50 mole percent, for example, 2 to 50 mole percent, for example, 3 to 50 mole percent, for example, 4 to 50 mole percent, 5 to 50 mole percent, for example, 5 to 45 mole percent, for example, 5 to 40 mole percent, for example, 5 to 35 mole percent. The glass in one embodiment comprises $Ga_2Se_3$ and not $In_2Se_3$. The glass in one embodiment comprises $In_2Se_3$ and not $Ga_2Se_3$.

The glass composition can further comprise one or more rare earth dopants, for example, 0 to 10 mole percent of the rare earth dopants, for example, greater than 0 to 10 mole percent of the rare earth dopants, for example, 0.5 to 10 mole percent of the rare earth dopants, for example, 1 to 10 mole percent of the rare earth dopants, for example, 1 to 9 mole percent of the rare earth dopants. The amount of rare earth dopants can be any numerical value in the range of from 0 to 10 mole percent.

The glass composition according to one embodiment comprises 0.5 to 50 percent $M_2Se$, for example, 1 or greater percent, for example, 2 or greater percent, for example, 3 or greater percent, for example, 4 or greater percent, for example, 5 or greater percent, for example, 6 or greater percent, for example, 7 or greater percent, for example, 8 or greater percent, for example, 9 or greater percent, for example, 10 or greater percent, for example, 11 or greater percent, for example, 12 or greater percent, for example, 13 or greater percent, for example, 14 or greater percent, for example, 15 or greater percent, for example, 16 or greater percent, for example, 17 or greater percent, for example, 18 or greater percent, for example, 19 or greater percent, for example, 20 or greater percent, for example, 21 or greater percent, for example, 22 or greater percent, for example, 23 or greater percent, for example, 24 or greater percent, for example, 25 or greater percent, for example, 26 or greater percent, for example, 27 or greater percent, for example, 28 or greater percent, for example, 29 or greater percent, for example, 30 or greater percent, for example, 31 or greater percent, for example, 32 or greater percent, for example, 33 or greater percent, for example, 34 or greater percent, for example, 35 or greater percent, for example, 36 or greater percent, for example, 37 or greater percent, for example, 38 or greater percent, for example, 39 or greater percent, for example, 40 or greater percent, for example, 41 or greater percent, for example, 42 or greater percent, for example, 43 or greater percent, for example, 44 or greater percent, for example, 45 or greater percent. The amount of $Ga_2Se_3$, $In_2Se_3$, or a combination thereof can be any numerical value in the range of from 0.5 to 50 mole percent, for example, 1 to 50 mole percent, for example, 2 to 50 mole percent, for example, 3 to 50 mole percent, for example, 4 to 50 mole percent, 5 to 50 mole percent, for example, 5 to 45 mole percent, for example, 5 to 40 mole percent, for example, 5 to 35 mole percent. The amount of $M_2Se$ can be any numerical value in the range of from 0.5 to 50 mole percent.

In some embodiments, the Se content is in the range of from 70 to 130% of the stoichiometric amount. "% excess Se", in Table 2, refers to the amount of Se in excess of the stoichiometric amount. The latter is the amount of Se when the components are Na$_2$Se, Ga$_2$Se3 and GeSe$_2$ but in chalcogenide glasses, one can move off stoichiometry. Example 10 is an example of where the Se content is 10% less than the stoichiometric amount.

The glass, in some embodiments, is transparent in the infra red spectrum.

Significant expansion of the glassforming region of alkali selenogermanate glasses allows for greater flexibility in tailoring glass properties such as characteristic temperatures (e.g. T$_g$), thermal expansion coefficient, refractive index, etc. that may be important for specific applications. Moreover, as noted above, the fact that the Ga and/or In to alkaline earth ratio is typically greater than one results in the efficient dispersal of rare earth dopants and, hence, improved luminescence.

The exemplary glasses were all prepared using typical chalcogenide glass melting/forming procedures. 10 g batches of elements (Na, Ga, Ge, Se) were loaded into fused silica ampoules in a N$_2$-filled glovebox. The fused silica ampoules were coated on the inside surface with a thin silicon film. The ampoules were evacuated to ~10$^{-5}$ Torr, flame sealed and then heated to ~950° C. in a rocking furnace. After melting, the ampoules were quenched in room temperature water to convert the selenide melts to glass.

Another way to minimize/eliminate reaction between silica and the alkali in the batch is to use standard practices to make a precursor material (either glass or sometimes polycrystalline) whose composition is that of the final desired one minus the Na$_2$Se fraction. The precursor material is then powdered, mixed with the appropriate amount of Na$_2$Se (or other alkali selenide), loaded into a carbon crucible, for example, vitreous C that is contained within a silica ampoule. The latter assembly is evacuated, sealed, heated in a furnace (not a rocking one as then the molten contents might spill out) to melt the batch, and then quenched to form the glass.

Exemplary glass compositions are tabulated below, with the first rows expressing the composition in terms of the molar percentages of the various selenide components and with the second rows expressing the composition in terms of atomic percent. Although the alkali metal in all cited examples is Na, analogous glasses are to be expected when Na is replaced by Li or Cs. The glass transition temperature (T$_g$) and the onset of crystallization (T$_x$) were measured by differential scanning calorimetry (DSC).

Exemplary glass compositions are shown in Tables 1-3.

TABLE 1

| | Example | | | | | |
|---|---|---|---|---|---|---|
| | 1 | 2 | 3 | 4 | 5 | 6 |
| mol % | | | | | | |
| Na$_2$Se | 5 | 20 | 7.5 | 32.5 | 15 | 20 |
| Ga$_2$Se$_3$ | 20 | 5 | 32.5 | 7.5 | 35 | 30 |
| GeSe$_2$ | 75 | 75 | 60 | 60 | 50 | 50 |
| atomic % | | | | | | |
| Na | 2.94 | 12.9 | 4.11 | 20.64 | 8.11 | 11.1 |
| Ga | 11.77 | 3.23 | 17.81 | 4.76 | 18.92 | 16.67 |
| Ge | 22.06 | 24.19 | 16.44 | 19.05 | 13.51 | 13.89 |
| Se | 63.23 | 59.68 | 61.64 | 55.56 | 59.46 | 58.34 |
| T$_g$ | 350 | 250 | 354 | 250 | 365 | 378 |
| T$_x$ | 457 | 300 | 446 | 352 | 445 | 447 |

TABLE 2

| | Example | | | | |
|---|---|---|---|---|---|
| | 7 | 8 | 9 | 10 | 11 |
| mol % | | | | | |
| Na$_2$Se | 10 | 25 | 40 | 7.5 | 15 |
| Ga$_2$Se$_3$ | 15 | 0 | 0 | 32.5 | 25 |
| GeSe$_2$ | 75 | 75 | 60 | 60 | 60 |
| % excess Se | 0 | 0 | 0 | −10 | 0 |
| Na | 6.06 | 16.67 | 26.67 | 4.38 | 8.57 |
| Ga | 9.09 | 0 | 0 | 18.98 | 14.29 |
| Ge | 22.73 | 25 | 20 | 17.52 | 17.14 |
| Se | 62.12 | 58.33 | 53.33 | 59.12 | 60 |

TABLE 3

| | Example | | | | | |
|---|---|---|---|---|---|---|
| | 12 | 13 | 14 | 15 | 16 | 17 |
| mol % | | | | | | |
| Na$_2$Se | 5 | 7.5 | 15 | 5 | 7.5 | 15 |
| Ga$_2$Se$_3$ | 20 | 32.5 | 35 | 20 | 32.5 | 35 |
| GeS$_2$ | 1.26 | 1.24 | 3.76 | 50 | 50 | 50 |
| GeSe$_2$ | 73.74 | 58.76 | 46.24 | 25 | 10 | |
| atomic % | | | | | | |
| Na | 2.94 | 4.11 | 8.11 | 2.94 | 4.11 | 8.11 |
| Ga | 11.76 | 17.81 | 18.92 | 11.76 | 17.81 | 18.92 |
| Ge | 22.06 | 16.44 | 13.51 | 22.06 | 16.44 | 13.51 |
| S | 0.74 | 0.68 | 2.03 | 29.41 | 27.4 | 27.03 |
| Se | 62.5 | 60.96 | 57.43 | 33.82 | 34.25 | 32.43 |
| appearance | dk red glass | dk red glass | dk red glass | orange glass | orange glass | orange glass |
| Tg | 346 | 350 | 346 | 359 | 380 | 396 |
| Tx | 447 | 447 | 448 | 497 | 493 | 508 |

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A glass composition comprising GeX$_2$ and M$_2$X, the composition comprising, in mole percent:
   45 to 99 percent GeX$_2$;
   0 to 50 percent Ga$_2$X$_3$, In$_2$X$_3$, or a combination thereof; and
   0.5 to 50 percent M$_2$X+RX, wherein M is an alkali metal, wherein X is Se and optionally S, Te or a combination thereof, wherein at least 50 mole percent of the total X is Se, wherein R is an alkaline earth metal, and wherein the X content is in the range of from 70 to 130% of the stoichiometric amount.

2. The glass composition according to claim 1, wherein X is Se.

3. The glass composition according to claim 2, comprising 50 percent or greater GeSe$_2$.

4. The glass composition according to claim 2, comprising 60 percent or greater GeSe$_2$.

5. The glass composition according to claim 2, comprising 1 to 40 percent M$_2$Se.

6. The glass composition according to claim 1, wherein M is chosen from Li, Na, K, Rb, Cs or combinations thereof.

7. The glass composition according to claim 1, wherein M is chosen from Li, Na or combinations thereof.

8. The glass composition according to claim 1, wherein M is Na.

9. The glass composition according to claim 1, comprising more than one alkali metal.

10. The glass composition according to claim 1, wherein (Ga and/or In)/M is greater than 1.

11. The glass composition according to claim 1, wherein (Ga and/or In)/R is greater than 1.

12. The glass composition according to claim 1, comprising 1 to 40 percent $Ga_2Se_3$, $In_2Se_3$, or a combination thereof.

13. The glass composition according to claim 1, further comprising at least one rare earth dopant.

14. The glass composition according to claim 13, comprising 0.5 to 10 mole percent of rare earth dopant.

15. The glass composition according to claim 1, wherein the glass is transparent in the infrared spectrum.

* * * * *